Oct. 3, 1961     S. SCHOLTENS     3,002,682

PINOCHLE SCORING DEVICE

Filed Aug. 7, 1956     2 Sheets-Sheet 1

INVENTOR.
*Siebolt Scholtens*

BY *Fred C. Matheny*

ATTORNEY

Oct. 3, 1961     S. SCHOLTENS     3,002,682
PINOCHLE SCORING DEVICE

Filed Aug. 7, 1956     2 Sheets-Sheet 2

INVENTOR.
Siebolt Scholtens
BY
Fred C. Matheny
ATTORNEY

United States Patent Office 3,002,682
Patented Oct. 3, 1961

3,002,682
PINOCHLE SCORING DEVICE
Siebolt Scholtens, 17216 162nd St. SE., Monroe, Wash.
Filed Aug. 7, 1956, Ser. No. 602,606
2 Claims. (Cl. 235—78)

My invention relates to a pinochle scoring device and an object of my invention is to provide a dial type pinochle scoring device of simple, inexpensive and durable construction which is easy to operate and which can be used to advantage as a visible scoring, indicating, computing and record keeping device by persons playing the game of pinochle.

Another object is to provide a dial type pinochle scoring and record keeping device which can be set to indicate the amount of a bid and the amount of a meld, and when so set, will provide a direct reading showing the number of tricks a successful bidder will have to take to score the amount of his bid and avoid being set.

Other objects are to provide a dial type scoring device which can be used to add to or subtract from a pinochle score and which can be set to indicate which of the players is the next successive dealer.

Other objects are to provide a dial type pinochle scoring device having a base with a circular dial of smaller size than said base rotatively mounted thereon, the base having hook shaped hold down members extending up and over the marginal portion of the dial and frictionally engaging the dial at substantially diametrically opposite points, the base and the dial both having marginal graduations marked thereon and the dial having a pointer movable thereover.

Other objects of my invention will be apparent from the following description taken in connection with the accompanying drawings.

In the drawings FIGURE 1 is a plan view of a dial type pinochle scoring device made in accordance with my invention and illustrating one setting of the relatively movable parts of the device to show a bid and a meld and the number of tricks a successful bidder will have to take to score the amount of his bid and avoid being set.

Like reference numerals indicate like parts throughout the several views.

Figure 1:
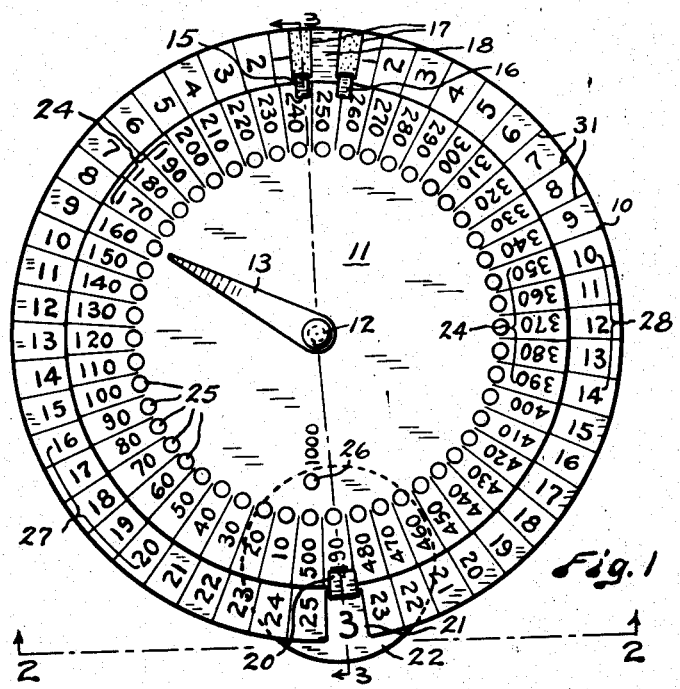

The scoring device shown in FIGS. 1 to 6 comprises a flat base 10, herein shown as a circular disc, but which can be varied in outline. A circular dial 11 is rotatively mounted centrally of the base 10 by a pivot 12. A pointer 13 is pivotally supported on the member 12 and is movable over the dial 11. A friction washer or disc 14 of rubber or like material is provided between the base 10 and dial 11. This washer 14 spaces the dial 11 from the base 10 and helps to provide the friction needed to hold the dial 11 in any position in which it is set.

Figure 3:
FIG. 3 is a sectional view taken substantially on broken line 3—3 of FIG. 1.
Figure 4:
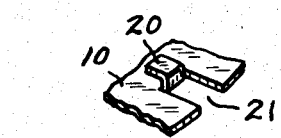
FIG. 4 is a perspective view showing a fragment of the peripheral portion of the base taken at a location where said base is provided with two upwardly and inwardly extending hold down members used as reference markers.
Figure 5:
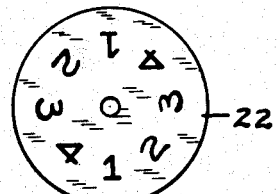
FIG. 5 is a perspective view similar to FIG. 4 showing another fragment of the peripheral portion of the base having one upwardly and inwardly extending hold down member.

The marginal portion of the base 10 is provided, at a point shown uppermost in FIGS. 1 and 3, with two spaced apart upwardly and inwardly extending hold down members 15 and 16, which also serve as markers to which the dial may be set. If the base 10 is made of material which can be cut and bent then the lugs 15 and 16 can be struck upwardly from said base 10 leaving in the marginal part of said base two notches 17 with a tongue 18 therebetween as further distinctive marking means. Preferably the marker members 15 and 16 and tongue 18 are colored a distinctive color, such as red, to more clearly mark this position at which numbers on the dial 11 are frequently set or read.

Figure 6:
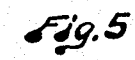
FIG. 6 is a detached plan view of a small dial used as a marker to indicate the dealer of the next hand.

The base 10 is also provided, at a point substantially diametrically opposite to the hold down members 15 and 16, with a hold down clip or lug 20 which extends upwardly and inwardly over the marginal part of the dial 11. A sight opening or notch 21 is provided in the marginal part of the base 10 outwardly from the hold down clip 20. A deal indicator dial 22 of small diameter is positioned beneath the base and is rotatively connected with the base by a rivet 23. A portion of the upper side of this small dial 22 is visible through the sight opening 21. A sponge rubber pad 19, of substantially greater thickness than the small dial 22 and having a cut out portion 19' providing clearance for said small dial 22, is cemented or otherwise fixedly attached to the bottom surface of the base 10. The periphery of the small dial 22 extends beyond the margin of the base 10 far enough so that said dial 22 can be adjusted rotatively by application of a finger to this protruding portion. Markings indicating the different players are provided on the upper face of the small dial 22. FIG. 6 shows these markings to be two sets of numbers ranging from 1 to 4. If desired letters or other distinctive markings can be used for this purpose instead of numerals. Each player is assigned a number or mark corresponding to one on the small dial 22 and at or before the beginning of each hand the dial 22 is set to show the number or mark of the next succeeding dealer.

The peripheral portion of the dial 11 has an annular number scale 24 marked thereon. In this scale the numbers are equally spaced and are expressed in multiples of ten ranging from ten to five hundred and progressively increase in one direction entirely around the dial. A marker hole 25 is provided in the dial 11 inwardly from each of the numbers of the scale 24 and a second marker hole 26 is provided inwardly from the five hundred number of the scale 24 and marked one thousand.

Figure 7:
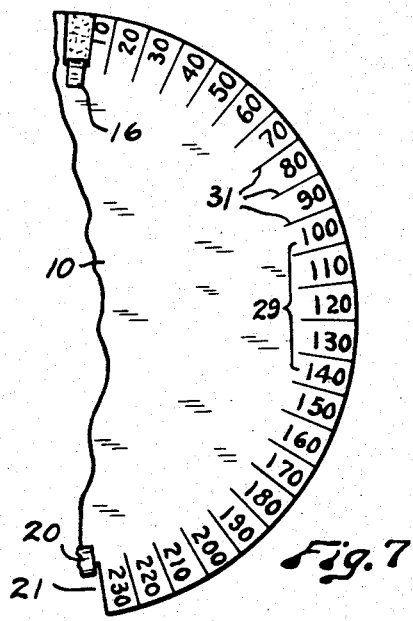
FIG. 7 is a fragmentary elevation of one portion of a base member showing alternative scale markings thereon.

Two other number scales 27 and 28 are provided on the base 10 outwardly from the periphery of the dial 11, each extending throughout approximately a half circle. The scale 27, shown at the left in FIG. 1, comprises equally spaced apart numbers ranging progressively from one to twenty-five, beginning at the location of the marker members 15 and 16 and terminating approximately at the location of the hold down clip 20. The scale 28, shown at the right in FIG. 1, comprises equally spaced apart numbers ranging progressively from one to twenty-three, beginning at the location of the marker members 15 and 16 and terminating approximately at the location of the hold down clip 20. Preferably the numbers of the scale 28 are marked in the color red. When these numbers of scale 28 are used in computing a score loss they are read as multiples of ten and they may be so marked on the scale as shown in FIG. 7 in which corresponding numbers of the scale 29 range from ten to two hundred thirty. The spaces occupied by the numbers of all three scales 24, 27 and 28 are preferably marked off by radial marks 31 which are equally spaced angularly considered.

In scoring pinochle the bids, the melds and the scoring are all expressed or counted in units of ten. In using this device to score four-hand pinochle preferably each two partners have one of these scoring devices. When the bidding of a hand is completed the dial 11 is adjusted so that the amount of the highest bid, as expressed on the scale 24, registers with the marker members 15 and 16. After the melds have been exposed the pointer 13 is moved to point to the number on the scale 24 which indicates the total meld credited to a successful bidder. The number on the scale 27 which registers with this total meld number and is also aligned with the pointer 13, will then indicate the number of tricks, each having a value of ten points, which the bidder will have to take to score the amount of his bid. For example, referring to FIG. 1, if the successful bid is two hundred fifty and the total meld of the successful bidder is one hundred sixty the scale 27 shows that the bidder will have to take nine tricks to avoid being set.

Figure 2:
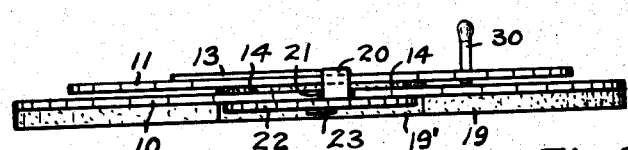
FIG. 2 is an edge view of the same looking in the direction of broken line 2—2 of FIG. 1.

Pegs, which may be broken off match sticks, one of which is shown and numbered 30 in FIG. 2, are used in keeping score by placing said pegs in the proper holes 25. If the score is a minus number this can be indicated by a red peg or by a match stick having a match head on it. Often a score of fifteen hundred is required to win a game of pinochle. In this instance a first marker peg may be used to score the first five hundred and left in the hole 25 opposite the number "500." A second marker peg may then be used to score the second five hundred and left in the hole 26 numbered "1000." A third marker peg may then be used to score the third and last five hundred. The game is thus scored in three successive laps by pegging up three successive counts of five hundred each. This device facilitates the scoring by indicating the correct positioning of the peg at the end of each hand after the dial 11 has been moved in accordance with the amount won or lost and by providing a direct reading of the score for the lap then being recorded. Any previously recorded scores of "500" or "1000" in the game can be added to this direct reading to give the total score at any point in the game.

A previously recorded score is always marked by a peg at one of the numbers of the dial scale 24. A gain which results from the playing of a hand can be added by setting the highest pegged number of the dial scale 24 on the number of the addition scale 27 which represents the gain and then moving the peg to the dial scale number which registers with the marker members 15 and 16. In doing this if the gain advances the peg past the station marked with the numbers "500" and "1000" the old peg is left in the proper hole at this station and a new peg is inserted at the station defined by marker members 15 and 16. The limit of a gain which can be thus recorded by the use of the scale 27 is two hundred fifty. For example, in FIG. 1, if a player's total score is one hundred thirty and he scores an additional one hundred twenty, then by positioning the one hundred thirty of scale 24 in registration with the one hundred twenty, that is the twelve of scale 27, the correct total score of two hundred fifty can be read directly between the markers 15 and 16.

In a similar manner the subtraction scale 28 can be used in cooperation with the dial scale 24 to record a loss up to the limit provided by the scale 28, which is two hundred thirty. If the amount of the loss is less than the previously recorded score the subtraction is accomplished by setting the highest previously recorded pegged score of dial scale 24 on the number of the subtraction scale 28 which indicates the amount of the loss and then moving the peg to the dial scale number which registers with the marker members 15 and 16. For example, in FIG. 1, if the player's score was four hundred thirty and he was set one hundred eighty the correct new score is read directly between the marker members 15 and 16 as two hundred fifty and the peg is moved to this station. However, if a player's loss is greater than his total score the dial 11 must be set twice to correctly position it. First, align the total score pegged on scale 24 with the amount of the loss indicated on scale 28. Second, subtract the amount shown between the marker members 15 and 16 from five hundred and the remainder will be the correct score. Then re-set the dial so that the amount of this remainder, as indicated on dial scale 24 registers with the marker members 15 and 16 and place a peg, usually red, which indicates a minus score at this station.

In adding a gain to a minus score when a player is in the hole, a positive score peg, usually white, is placed at the number on the dial scale 24 which correctly indicates the amount of the gain. The dial 11 is then moved to align this positive score peg with the number on the subtraction scale 28 which correctly indicates the amount the player is in the hole. The correct score is then the amount shown on the dial scale 24 at the markers 15 and 16 and the positive score peg is moved to this station.

When the procedure hereinbefore is followed the setting of the peg at the station defined by markers 15 and 16 will always be correct and the score will be correctly totaled at the end of the game even though no attention is paid to the readings of the dial scale 24 at the location of said markers 15 and 16.

The graduations of all of the scales 24, 27 and 28 are equally spaced angularly considered and this provides a scale relationship in which any dial scale number registering with the marker members 15 and 16 is always the true difference between any greater dial scale number and ten times the subtraction scale number with which said greater dial scale number registers and is always the true sum of any lesser dial scale number and then times the addition scale number with which said lesser dial scale number registers. If dial scale numbers lower than the subtraction scale numbers, read in tens, are registered with the subtraction scale numbers the device will not operate as just hereinabove described. Also it will not operate as just hereinabove described if dial scale numbers higher than the number at the marker members 15 and 16 are registered with the addition scale numbers of scale 27.

Figure 8:
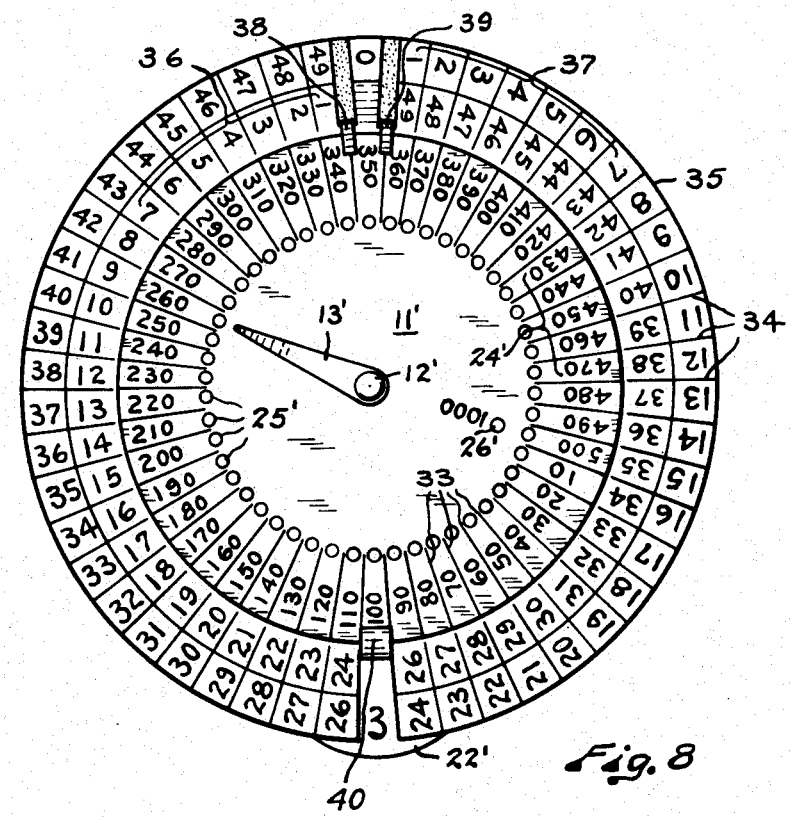
FIG. 8 is a plan view of a scoring device of modified form having two scales each three hundred sixty degrees in extent marked on the peripheral portion of its base.

FIG. 8 shows a dial type scoring device of modified form in which the addition and subtraction scales are differently positioned and each have more numbers than the corresponding scales shown in FIGS. 1 to 7 so they can be used to add or subtract numbers in multiples of ten ranging from ten to four hundred ninety. This scoring device of FIG. 8 comprises a base 35 having two annular number scales 36 and 37 marked on the peripheral face portion thereof, one outwardly from the other. Each scale 36 and 37 is marked off by radial lines 34 into fifty equal divisions and each of said scales, starting from a zero position, is marked with the numerals "1" to "49" inclusive. The numerals of both scales 36 and 37 are read in terms of tens in using these scales. Scale 36 is an addition scale and the numerals thereof increase progressively in one direction around the base 35. The scale 37 is a subtraction scale and its numerals increase progressively in an opposite direction from the numerals of scale 36.

The base 35 has combined marker and hold down members 38 and 39 and a hold down clip 40 which correspond respectively to the parts 15, 16 and 20 of FIG. 1. Said base 35 further has a dial 11', pivot 12', pointer 13', perforations 25' and 26', scale 24' and deal indicator 22' all similar respectively to the previously described parts 11, 12, 13, 25, 26, 24 and 22 of FIGS. 1 to 6.

The scale 24' is divided into fifty equal divisions by radial lines 33 and has numbers in multiples of ten ranging from ten to five hundred marked in these divisions with the number values increasing progressively around the dial 11' in the same direction as the number values of the subtraction scale 37 and in the opposite direction from the number values of the addition scale 36.

When a number of scale 24' indicating the amount of a bid is set at the markers 38 and 39 and the pointer 13' is set on the number of the dial scale 24' indicating the amount of the meld the number on scale 36 aligned with the pointer 13' will indicate the number of tricks at a value of ten points per trick, which must be taken to make good the bid. If a player wishes to add a predetermined amount, not in excess of five hundred, to a previously earned score pegged on dial scale 24' he sets the pegged number of dial scale 24' on the number of addition scale 36 indicating the amount to be added and advances his marker peg to the hole 25' of dial scale 24 at the location of markers 38 and 39. If his total score is less than five hundred this total can be read directly on scale 24' at marker members 38 and 39. If his total is more than five hundred the reading at the marker members 38 and 39 will be correct for the lap being recorded and the peg will be correctly positioned but amounts represented by any peg or pegs at the "500" station will have to be added mentally to total the player's score for the game. However, it is not necessary to mentally total this amount since the setting of the last marker peg is correct if the numbers of the several scales have been correctly registered in each instance.

In using the scoring device of FIG. 8 to subtract a loss not in excess of a previously recorded score which score is indicated by a peg in one of the holes 25' the dial 11 is moved to register the pegged score of scale 24' with the number of the subtraction scale 37 which indicates the amount of the loss and the peg is then moved back into the hole 25' at the station of markers 38 and 39. At this station the marker peg will be correctly positioned and the correct score for the lap indicated by the corresponding number on the scale 24', it being understood that the presence of marker pins in the holes 25' and 26' at the "500" station of scale 24' must be taken into consideration if the total score is to be computed. The device of FIG. 8 is used in the same manner as the device of FIGS. 1 to 7 in recording a loss which is greater than a total accumulated score and which leaves a player in the hole.

This pinochle scoring device is neat and ornamental in appearance, is compact, occupies little space, lies flat on the table, will not slip or slide or mar the table and can be operated with one hand leaving the other hand free to hold the cards. It keeps the record of bids, melds, scores and dealers always visible to the players thereby minimizing causes of mis-understanding and argument among players.

It will be understood that the foregoing disclosure is merely illustrative and that changes may be made within the scope of the following claims.

I claim:
1. A scoring device for card games comprising a thin flat base; a thin flat circular dial of smaller size than said base; a pivot member positioned centrally of said dial and said base rotatively mounting said dial on said base with the base extending beyond the periphery of the dial; a disc of high friction resilient material and of substantially smaller diameter than said dial disposed coaxially between said dial and said base spacing said dial from said base; a hook shaped hold down clip integral with and struck from the marginal portion of said base and extending upwardly and inwardly over the marginal portion of said dial frictionally engaging said dial and forming a sight opening in said base; two spaced apart hook shaped hold down members integral with and struck from the marginal portion of said base and positioned substantially diametrically opposite to said hold down clip and extending upwardly and inwardly over the peripheral portion of said dial frictionally engaging said dial and forming spaced apart reference markers fixed relative to said dial, said disc of high friction resilient material holding said dial outwardly against said hold down clip and said hold down members; a number scale marked on the peripheral portion of said dial; other number scales marked on said base outwardly from the periphery of said dial; a pointer mounted on and frictionally held by said central pivot member and positioned above and movable over said dial; and a deal indicator dial positioned under said base and rotatively supported from said base and having a portion of its face movable across the sight opening formed in said base by the displacement therefrom of said hold down clip, the portion of said dial which is movable across said sight opening having markings thereon.

2. A scoring device for card games comprising a thin flat base; a thin flat circular dial of smaller size than said base; a pivot member positioned centrally of said dial and said base rotatively mounting said dial on said base with the base extending beyond the peripheral portion of the dial; a disc of high friction resilient material and of substantially smaller diameter than said dial disposed between said dial and said base coaxially thereof spacing said dial from said base; a hook shaped hold down clip integral with and struck from the marginal portion of said base and extending upwardly and inwardly over said dial leaving a sight opening in the peripheral portion of said base, said clip frictionally engaging said dial; two spaced apart hook shaped hold down members integral with and struck from the marginal portion of said base and positioned substantially diametrically opposite to said hold down clip and extending upwardly and inwardly over the peripheral portion of said dial frictionally engaging said dial and forming narrowly spaced reference markers fixed relative to said dial, said disc of high friction resilient material holding said dial outwardly against said hold down clip and said hold down members; a number scale on the peripheral portion of said dial; other number scales marked on said base outwardly from the periphery of said dial; marker peg receiving perforations in said dial inwardly from and in registration with the numbers of the scale on said dial; a deal indicator dial rotatively connected with said base and positioned under and in contact with said base with its periphery projecting a short distance beyond the margin of said base and a portion of its face positioned for exposure through the peripheral sight opening formed in said dial by the displacement therefrom of said hold down clip, the portion of said deal indicator disc face which registers with said sight opening having deal indicating markings thereon; and a pad of elastic material substantially thicker than said deal indicator disc secured to the lower side of said thin flat base and extending at least partially around said deal indicator disc holding said disc clear of surfaces on which said scoring device rests and protecting said disc.

References Cited in the file of this patent
UNITED STATES PATENTS

| D. 159,808 | Haring | Aug. 22, 1950 |
| 533,436 | Clark | Feb. 5, 1895 |
| 855,827 | Willson | June 4, 1907 |
| 987,151 | Marshall | Mar. 21, 1911 |
| 988,665 | Sanders | Apr. 4, 1911 |
| 997,986 | Freeman | July 18, 1911 |
| 2,567,098 | Boyden | Sept. 4, 1951 |
| 2,825,505 | Hall | Mar. 4, 1958 |

FOREIGN PATENTS

| 504,276 | Great Britain | Apr. 24, 1939 |